Patented Nov. 22, 1949

2,488,631

UNITED STATES PATENT OFFICE 2,488,631

CELLULOSE ETHERS AND THE PROCESS FOR PRODUCING THE SAME

Walter B. Kunz, Fredericksburg, Va., assignor, by mesne assignments, to American Viscose Corporation, Wilmington, Del., a corporation of Delaware No Drawing. Application May 19, 1945,
Serial No. 594,791

8 Claims. (Cl. 260—231)

The invention relates in general to the production of hydrophilic cellulose ethers and, in particular, to a process for the recovery of the cellulose ether from the reaction mixture.

The usual practice of making hydrophilic cellulose ethers, e. g., water-soluble or alkali-soluble cellulose ethers, involves a number of steps. The cellulosic starting material is first mercerized by immersing the material in a caustic alkali solution. After steeping for the necessary period in the alkali, the excess alkali is pressed out, and the alkali cellulose material is shredded or disintegrated into a fluffy mass. Depending upon the degree of viscosity desired in the finished product, the alkali cellulose or the cellulose ether may be degraded as desired. Etherification of the alkali cellulose is then carried out in an alkaline medium. After completion of the reaction, the alkali in the solution is neutralized. The by-products may be separated from the cellulose ether, if desired, and the cellulose ether dried.

However, it has been found that in such prior procedures the reaction mixture, i. e., the mixture of cellulose ether and excess alkali and by-products, tends to gel or cake during the neutralization and drying operations. This results in inadequate drying of the product and prevents the formation of a granular and free-flowing product. This is due to the fact that the cellulose ether produced tends to dissolve in the aqueous alkaline reaction medium since the ether is water- or alkali-soluble. When the product is neutralized, as heretofore, using acids such as sulfuric acid, acetic acid, and the like, the reaction mass forms a gel or cake. In addition, such neutralization of the excess alkali by the use of such acids produces a neutral nonhydrated salt and water, thereby increasing the amount of water originally present in the reaction product which becomes trapped within the gel. In particular, acids which form hygroscopic salts are disadvantageous because they increase the tendency to gel. Heretofore, upon heating to dry the product, globular jellylike masses containing cellulose ether were formed instead of the desired finely ground and free-flowing particles. Further drying had the effect of producing a hard hornlike mass which is practically impossible to powder or to dissolve.

Therefore, it is a general object of the invention to form a granular free-flowing mass comprising a hydrophilic cellulose ether.

It is a specific object of the present invention to manufacture hydrophilic cellulose ether compositions without gelling or caking of the product.

It is a further object of the invention to prevent gelatinization of the cellulose ether product during neutralization of the reaction mixture.

It is a more specific object of the invention to neutralize the alkali in a cellulose ether reaction mixture without forming additional free water.

It is another object of the present invention to provide for the neutralization and dehydration of a cellulose ether reaction mixture in a single step.

Other objects of the invention will in part be obvious and will in part appear hereinafter.

According to the present invention, the alkali present in the reaction mixture after etherification of cellulose in an alkaline medium is neutralized by the use of an acid which will react with the alkali to form a hydrated salt which is stable at temperatures up to 35° C., preferably up to 45° C. There are two sources from which the water in the reaction mixture is derived: (a) the water in the alkali solution left after the pressing of the alkali cellulose before etherification and (b) the water produced by the neutralization of the alkali by the acid after etherification. By forming such a hydrated salt, a major part of the water is chemically removed from the reaction mixture. The remaining water, if any, can be removed (a) by drying the reaction mixture at a temperature below the decomposition temperature of the hydrate and/or (b) by adding to the mixture an anhydrous salt similar to the hydrate produced by the neutralization in an amount sufficient to bind the remaining free water. Thus, at all times the amount of free water is kept below the amount which causes gelling, which is normally 25 per cent by weight of the cellulose. The neutralization acids heretofore used in former methods did not form stable hydrates and, therefore, did not effect dehydration of the mass. By the present invention, the free water is chemically bound by the formation of the hydrate salt, and the deleterious effect of caking and gelling of the cellulose either is thus prevented.

In the preferred embodiment, the etherification reaction is carried out in an aqueous alkaline medium containing the minimum amount of water necessary to effect uniform etherification, that is, an amount sufficient to thoroughly wet the alkali cellulose. The amount of the hydrate-forming acid employed is sufficient to neutralize all the alkali and to combine with a major portion of the water present. It is apparent that the total amount of hydrated salt which can be formed is limited by the total amount of alkali present in the reaction mixture. For example, if 1 mole of acid neutralizes 2 moles of sodium hydroxide to form a hydrated salt containing 12 moles of water of which 2 moles of water are formed by neutralization, then it is obvious that the salt is capable of binding 5 moles of water for each mole of alkali present. Accordingly, if the reaction mixture contains from 15 to 20 per cent alkali, the formation of the hydrate upon neutralizing such alkali will theoretically combine with from 40 to 50 per cent of the water present. If the alkali present is insufficient to give enough hydrate, some anhydrous salt may be added in addition to the acid.

The cellulose ethers have a great variety of properties, according to the number and nature of the ether groups which have been introduced into the cellulose unit. Some are soluble in water, some in alkali, and some in organic solvents. The process of the present invention applies to those water-soluble and alkali-soluble cellulose ethers which shall be collectively referred to hereinafter as hydrophilic cellulose ethers to distinguish them from the hydrophobic ethers which are soluble in organic solvents.

As the cellulosic starting material for use in the process, there may be employed cellulose in any of the forms in which it occurs in nature, such as wood pulp and cotton linters, preferably bleached or scoured to remove non-cellulosic constituents, also cellulose conversion products, such, for example, as oxy-cellulose, hydrocellulose and cellulose hydrates of all kinds including cellulose hydrate formed by the mechanical beating of cellulose in the presence of water, or by treating cellulose with mineral acids or alkalies, and cellulose hydrate obtained by regeneration from viscose and cuprammonium solutions or by de-esterification of cellulose esters. In the now preferred practice, there is employed as a starting material a purified wood pulp. The expression "cellulose" as used herein is intended to include all the cellulosic materials of the classes above-enumerated.

To condition the cellulosic starting material for use in the process, the cellulose is preferably swollen or mercerized with a solution of a strong alkali, for example by treatment with from 10 per cent to 25 per cent, preferably 18 per cent, sodium hydroxide at room temperature. For the alkali there may be employed any strong alkali such, for example, as sodium hydroxide, potassium hydroxide or lithium hydroxide. Since the viscosity of the solutions of the final product will depend in part upon the degradation resulting from this treatment, the temperature and period of treatment should be controlled to prevent excess degradation of the cellulose.

After draining off the excess alkali, the alkali cellulose is pressed to two and one-half to three times the weight of the air-dry cellulose. The resulting alkali cellulose is shredded and may be aged if desired.

The alkali cellulose is then etherified while wet with the aqueous alkaline solution remaining therein after pressing and shredding. The alkali cellulose is etherified in the form of solid crumbs resulting from the shredding operation, no more water being present than is contained in the residual alkali resulting from the pressing operation.

For the etherifying agent, there may be employed any alkylating agent selected from the group consisting of alkylating agents and hydroxy-alkylating agents. The present process is not required for making carboxy-alkyl ether because the acid ethers so formed are insoluble in water and may be washed. As alkylating agents there may be used, for example, alkyl esters of inorganic acids such, for example, as dimethyl sulfate, diethyl sulfate, methyl sodium sulfate, and alkyl halides, such as methyl chloride, ethyl chloride and ethyl bromide and benzyl chloride. The hydroxy-alkylating agents may comprise, for example, an alkylene oxide such as ethylene oxide, propylene oxide, also glycides and the like, and any suitable halohydrin such, for example, as ethylene chlorhydrin, epichlorhydrin and the like. The invention is particularly advantageous and necessary when the etherifying agent is an alkylene oxide or halohydrin because none of the alkali is neutralized by this reagent.

The conditions under which the etherifying reaction takes place should be carefully controlled. Since the etherifying reaction is exothermic, the temperature should be controlled by cooling the reaction mixture, and/or by adding the etherifying agent in small quantities over an extended period of time. It is desirable to add the etherifying agent in small quantities over a period of several hours with constant mixing while allowing the temperature to increase gradually by not more than about 10° C. per hour and preventing the temperature from rising at any time above about 70° C. If the etherifying agent is gaseous at the temperature of reaction, the etherifying treatment is carried out in a closed vessel, preferably in vacuo; otherwise, the reaction may be carried out in an open vessel. The extent of reaction may be followed by testing the solubility in hot and cold water and in 10 per cent aqueous solution of sodium hydroxide at 0° C. When the product dissolves in the desired vehicle practically without residue, the reaction is discontinued. In general, with substantially unaged alkali cellulose, the cellulose ethers produced therefrom are soluble in 10 per cent aqueous caustic alkali solution when they contain from 0.25 to 1 ether group per cellulose unit and soluble in water when they contain from 1 to 1½ groups per unit of cellulose.

It should be understood that the solubility characteristics of the product will depend, inter alia, upon the nature of the cellulosic raw material employed, and/or the degree of degradation of the cellulose at the time of treatment, and/or the period of the reaction, and/or the temperature at which the reaction is conducted, and/or the nature and proportions of the etherifying agents used in the process, and other factors well known to those skilled in the art.

After the etherification has been completed, it is necessary to neutralize the alkali present before drying the product. For the neutralizing agent there is employed in the present process an acid which forms a hydrated salt by reaction with the caustic alkali. The acid is added in the solid or liquid form or as a concentrated aqueous solution. To effect uniform and thorough neutralization the acid is well mixed with the cellulose ether. Any substance which forms a hydrated salt which is stable at temperatures up to 35° C. may be used. Although such substances as sulfuric acid and carbon dioxide, heretofore employed in prior methods to neutralize the alkali, also form salts which combine with water to produce hydrates, i. e., the hydrates of sodium carbonate and sodium sulfate, such hydrates decompose at temperatures below 35° C. and, therefore, are not operative in the present invention. Inasmuch as the etherification is carried out on substantially solid crumbs obtained from the shredder and in the presence only of the alkali left in the crumbs after the pressing operation, there is a minimum amount of water present, actually from 10 to 15 moles per mole of cellulose. However, if the hydrate produced does not bind a major portion of the water present, then a solid anhydrous salt either the same or different from that produced in situ may be added to the reaction mixture, together with or after the addition of the acid, in an amount sufficient to chemically combine with part or all of the remaining free water.

The mixture of substantially dry cellulose ether and hydrated salt is then removed from the reaction vessel and preferably spread in a thin layer in trays and subjected to drying. The drying is preferably carried out in two stages, that is, the major portion of the remaining free water is driven out while heating to a temperature lower than the decomposition temperature of the hydrated salt, and thereafter the drying is completed by allowing the temperature to rise gradually up to 100° C. The product is in the form of granules which are thoroughly dried and free-flowing and comprise a mixture of the cellulose ether and the hydrated salt. It is immaterial that the final drying may cause some dehydration of the hydrated salt since the product is neutral during the last stage of the drying operation, and because of the decomposition of the hydrate always occurs so slowly that the water is driven off as fast as it is liberated, there is never enough water present to cause the mass to gel.

If desired, the salt may be removed from the dried product, for example, by dissolving the product in water or aqueous alkali and then dialyzing the salt against pure water or alkali solution.

The following table will show suitable acids which may be used in the process of the invention and their corresponding hydrated salts and decomposition temperatures. It is to be understood that the invention is not limited to these acidic substances listed below, but may include all those substances which form hydrates which are stable up to 35° C.

By way of illustrating but not by way of limiting the invention, there will be given the following examples:

Example I 285 pounds of wood pulp are steeped for 45 minutes in a solution of 19 per cent sodium hydroxide at 22° C. The alkali cellulose thus formed is pressed until enough caustic solution has been removed to give a press weight of approximately 760 pounds. It is then shredded for 45 minutees at 20° C. and aged in a closed vessel for 106 hours at 24° C. After ageing, the product is treated in a shredder, while mixing, with 225 pounds of ethylene oxide, which is added at the rate of 25 pounds per hour. The temperature of the reaction mixture is kept during most of the run between 20° C. and 25° C. After the etherification, there is mixed with the alkaline reaction mass 174.5 pounds of 85 per cent phosphoric acid (pure food grade). The temperature of the reaction mixture rises immediately after the addition of the acid to approximately 45–50° C. The mixing is continued for about three hours, at the end of which time the product cools to about 30° C. It is then removed from the shredder and dried below 35° C. and then increased to 100° C., whereupon it may be ground or passed through a sieve. The product consists of a mixture of hydroxyethyl cellulose and hydrated sodium phosphate and has a pH of 8.4.

Example II

The procedure of Example I is carried out except that 197 pounds of 75 per cent phosphoric acid (pure food grade) are used.

Example III

The process is carried out in accordance with Example I, but in addition to the phosphoric acid there is added 117 pounds of anhydrous sodium phosphate in the solid state to the reaction mixture.

A molecular representation of the reaction may be shown as follows:

(a) $H_3PO_4 + 3NaOH + 9H_2O \rightarrow Na_3PO_4 \cdot 12H_2O$
(b) $H_3PO_4 + 2NaOH + 10H_2O \rightarrow Na_2HPO_4 \cdot 12H_2O$
(c) $H_3PO_4 + 2NaOH + 5H_2O \rightarrow Na_2HPO_4 \cdot 7H_2O$ The presence of the salt in the cellulose ether is not detrimental for many industrial operations. After shipment to the point of use, the salt may be removed from the water-soluble cellulose ether by dissolving the mixture of salt and ether in water and dialyzing the salt through a semi-

| Acids | Hydrates | Decomposition Temperatures |
|---|---|---|
| | | °C. |
| $H_3PO_4$ | $Na_3PO_4 \cdot 12H_2O$ | 75 |
| | $Na_2HPO_4 \cdot 12H_2O$ | 36.4 |
| | $Na_2HPO_4 \cdot 7H_2O$ | 48 |
| $H_4P_2O_7$ | $Na_4P_2O_7 \cdot 10H_2O$ | 93.8 |
| | $Na_2H_2P_2O_7 \cdot 6H_2O$ | 220 |
| $H_4P_2O_6$ | $Na_2H_2P_2O_6 \cdot 6H_2O$ | 100 |
| $NH_4H_2PO_4$ | $NaNH_4HPO_4 \cdot 4H_2O$ | 79 |
| $C_3H_5(OH)_2OPO_3H_2$ | $Na_2C_3H_5(OH)_2PO_4 \cdot 5\frac{1}{2}H_2O$ | 130 |
| $H_3AsO_4$ | $Na_3AsO_4 \cdot 12H_2O$ | [1] 86.3 |
| | $Na_2HAsO_4 \cdot 12H_2O$ | 100 |
| | $Na_2HAsO_4 \cdot 7H_2O$ | 180 |
| $CH_3AsO(OH)_2$ | $Na_2AsCH_3O_3 \cdot 6H_2O$ | [1] 130 |
| $H_2SO_3$ | $Na_2SO_3 \cdot 7H_2O$ | 150 |
| $AlH(SO_4)_2$ | $NaAl(SO_4)_2 \cdot 12H_2O$ | [1] 61 |
| $HSbO_3$ | $NaSbO_3 \cdot 7H_2O$ | 200 |
| $H_2MoO_4$ | $Na_2Mo_3O_{10} \cdot 7H_2O$ | 100 |
| $H_2MoO_4$ | $Na_6Mo_7O_{24} \cdot 22H_2O$ | 120 |
| $AlH(SO_4)_2$ | $KAl(SO_4)_2 \cdot 12H_2O$ | 64.5 |
| $H_4P_2O_7$ | $K_4P_2O_7 \cdot 3H_2O$ | 180 |
| $HCr(SO_4)_2$ | $KCr(SO_4)_2 \cdot 12H_2O$ | [1] 89 |

[1] Melting point.

permeable membrane, such as regenerated cellulose. The salt need not be removed from its admixture with the alkali-soluble water-insoluble cellulose ethers because these ethers are normally dissolved in 10 per cent alkali solution in which the salt is insufficient to cause precipitation of the ether. After application of the cellulose ether solution, for example, in textile sizing, the cellulose ether may be coagulated with an acid and the fabric then washed. During this washing operation, the salt which was present in the cellulose ether composition is removed.

It is thus seen that the present invention provides a novel means whereby a dry free-flowing hydrophilic cellulose ether composition may be formed and which can be shipped in the dry form, thus avoiding the tremendous expense of shipping large quantities of water. Moreover, because the present product is granular and free-flowing, it may be more readily dissolved at the point of application than the gel-like masses heretofore delivered. In contrast, the cellulose ethers heretofore produced tended to form lumps during the dissolving.

Since certain changes in carrying out the above process and certain modifications in the composition which embody the invention may be made without departing from its scope, it is intended that all matter contained in the above description shall be interpreted as illustrative and not in a limiting sense.

I claim:

1. In a process for the manufacture of hydrophilic cellulose ethers which are soluble in aqueous media comprising the steps of converting a cellulosic material to alkali cellulose by subjecting it to the action of an aqueous solution of an alkali metal hydroxide, pressing the alkali cellulose to remove excess alkali solution, etherifying the alkali cellulose while wet with said alkali with an etherifying agent selected from the group consisting of alkylating agents and hydroxy-alkylating agents until a cellulose ether is produced, neutralizing the alkali in the reaction mixture, and removing water from the reaction mixture, that improvement which comprises neutralizing the reaction mixture with an acid selected from the group consisting of organic and inorganic acids the hydrated alkali metal salts of which formed from the particular alkali metal of the aforementioned alkali metal hydroxide are stable up to at least 35° C. the neutralization being effected below the decomposition temperature of the particular hydrated alkali metal salt whereby water is combined in said hydrated salt as water of crystallization during the neutralization, and removing the major portion of the remaining uncombined water in the neutralized product by drying the product without separation of the hydrate from the product at a temperature below the decomposition temperature of said hydrate.

2. In a process for the manufacture of hydrophilic cellulose ethers which are soluble in aqueous media comprising the steps of converting a cellulosic material to alkali cellulose by subjecting it to the action of an aqueous solution of an alkali metal hydroxide, pressing the alkali cellulose to remove excess alkali solution, etherifying the alkali cellulose while wet with said alkali with an etherifying agent selected from the group consisting of alkylating agents and hydroxy-alkalating agents until a hydrophilic cellulose ether is produced, neutralizing the alkali in the reaction mixture, and removing water from the reaction mixture, that improvement which comprises neutralizing the reaction mixture with an acid selected from the group consisting of organic and inorganic acids the hydrated alkali metal salts of which formed from the particular alkali metal of the aforementioned alkali metal hydroxide are stable up to at least 35° C. the neutralization being effected below the decomposition temperature of the particular hydrated alkali metal salt whereby water is combined in said hydrated salt as water of crystallization during the neutralization, adding to the reaction mixture an anhydrous alkali metal salt corresponding to the hydrate produced by the neutralization in an amount sufficient to bind a major portion of the remaining uncombined water in the neutralized product, and drying the product at a temperature below the decomposition temperature of said hydrate.

3. In a process for the manufacture of hydrophilic cellulose ethers which are soluble in aqueous media comprising the steps of converting a cellulosic material to alkali cellulose by subjecting it to the action of an aqueous solution of an alkali metal hydroxide, etherifying the alkali cellulose while wet with said alkali with an etherifying agent selected from the group consisting of alkylating agents and hydroxy alkylating agents until a hydrophilic cellulose ether is produced, neutralizing the alkali in the reaction mixture, and removing water from the reaction mixture, that improvement which comprises neutralizing the reaction mixture with an acid selected from the group consisting of organic and inorganic acids the hydrated alkali metal salts of which formed from the particular alkali metal of the aforementioned alkali metal hydroxide are stable up to at least 35° C. the neutralization being effected below the decomposition temperature of the particular hydrated alkali metal salt whereby water is combined in said hydrated salt as water of crystallization during the neutralization, and adding to the reaction mixture an anhydrous alkali metal salt corresponding to the hydrate produced by the neutralization in an amount sufficient to bind a major portion of the remaining uncombined water in the neutralized product.

4. In a process for the manufacture of hydrophilic cellulose ethers which are soluble in aqueous media comprising the steps of converting a cellulosic material to alkali cellulose by subjecting it to the action of an aqueous solution of an alkali metal hydroxide, pressing the alkali cellulose to remove excess alkali solution, etherifying the alkali cellulose while wet with said alkali with an etherifying agent selected from the group consisting of alkylating agents and hydroxy-alkylating agents until a hydrophilic cellulose ether is produced, neutralizing the alkali in the reaction mixture, and removing water from the reaction mixture, that improvement which comprises neutralizing the reaction mixture with an acid selected from the group consisting of organic and inorganic acids the hydrated alkali metal salts of which formed from the particular alkali metal of the aforementioned alkali metal hydroxide are stable up to at least 35° C. the neutralization being effected below the decomposition temperature of the particular hydrated alkali metal salt whereby water is combined in said hydrated salt as water of crystallization during the neutralization, removing the major portion of the remaining uncombined water in the neutralized product by drying the product without separation of the hydrate from the product at a temperature below the decomposition temperature of said hydrate, and thereafter completing the drying at a temperature above said decomposition temperature.

5. In a process for the manufacture of hydrophilic cellulose ethers which are soluble in aqueous media comprising the steps of converting a cellulosic material to alkali cellulose by subjecting it to the action of an aqueous solution of an alkali metal hydroxide, pressing the alkali cellulose to remove excess alkali solution, etherifying the alkali cellulose while wet with said alkali with an etherifying agent selected from the group consisting of alkylating agents and hydroxy-alkylating agents until a hydrophilic cellulose ether is produced, neutralizing the alkali in the reaction mixture, and removing water from the reaction mixture, that improvement which comprises neutralizing the reaction mixture with an acid selected from the group consisting of organic and inorganic acids the hydrated alkali metal salts of which formed from the particular alkali metal of the aforementioned alkali metal hydroxide are stable up to at least 35° C. the neutralization being effected below the decomposition temperature of the particular hydrated alkali metal salt whereby water is combined in said hydrated salt as water of crystallization during the neutralization, adding to the reaction mixture an anhydrous alkali metal salt corresponding to the hydrate produced by the neutralization in an amount sufficient to bind a major portion of the remaining uncombined water in the neutralized product, drying the product without separation of the hydrate from the product at a temperature below the decomposition temperature of the hydrate, and thereafter completing the drying at a temperature above said decomposition temperature.

6. The process of claim 1 in which neutralization is effected by an acid the hydrated alkali metal salts of which are stable up to at least 45° C.

7. The process of claim 1 in which the alkali metal hydroxide is sodium hydroxide.

8. In a process for the manufacture of hydrophilic cellulose ethers which are soluble in aqueous media comprising the steps of converting a cellulosic material to alkali cellulose by subjecting it to the action of an aqueous solution of sodium hydroxide, pressing the alkali cellulose to remove excess alkali solution, etherifying the alkali cellulose while wet with said alkali with an etherifying agent selected from the group consisting of alkylating agents and hydroxy alkylating agents until a cellulose ether is produced, neutralizing the alkali in the reaction mixture, and removing water from the reaction mixture, that improvement which comprises neutralizing the reaction mixture with phosphoric acid, the neutralization being effected at a temperature between room temperature and about 50° C. and removing the major portion of the remaining uncombined water in the neutralized product by drying the product without separation of the hydrate from the product at a temperature below 35° C.

WALTER B. KUNZ.

REFERENCES CITED

The following references are of record in the file of this patent:

UNITED STATES PATENTS

| Number | Name | Date |
|---|---|---|
| 1,510,735 | Baybutt | Oct. 7, 1924 |
| 2,134,895 | Seymour et al. | Nov. 1, 1938 |
| 2,351,258 | Freeman et al. | June 13, 1944 |
| 2,357,469 | Houghton et al. | Sept. 5, 1944 |

FOREIGN PATENTS

| Number | Country | Date |
|---|---|---|
| 473,975 | Great Britain | Oct. 22, 1937 |
| 495,173 | Great Britain | Nov. 8, 1938 |

OTHER REFERENCES

Mellor, "Modern Inorganic Chemistry," Longmans, Green & Co., New York, N. Y., 1939, page 288.